US012800461B2

(12) United States Patent
Xiong et al.

(10) Patent No.: US 12,800,461 B2
(45) Date of Patent: Nov. 17, 2026

(54) SURFACE DENSITY FULL-DETECTION METHOD AND SYSTEM

(71) Applicant: Changzhou Reechi Precision Measuretech Co., Ltd, Changzhou (CN)

(72) Inventors: Genchao Xiong, Changzhou (CN); Guoping Cao, Changzhou (CN); Pengcheng Zhu, Changzhou (CN); Qun Huang, Changzhou (CN); Kun Chen, Changzhou (CN); Jing Ge, Changzhou (CN)

(73) Assignee: Changzhou Reechi Precision Measuretech Co., Ltd., Changzhou (CN)

( * ) Notice: Subject to any disclaimer, the term of this patent is extended or adjusted under 35 U.S.C. 154(b) by 73 days.

(21) Appl. No.: 19/069,902

(22) Filed: Mar. 4, 2025

(65) Prior Publication Data

US 2026/0133107 A1 May 14, 2026

Related U.S. Application Data

(63) Continuation of application No. PCT/CN2024/131630, filed on Nov. 12, 2024.

(30) Foreign Application Priority Data

Sep. 12, 2023 (CN) ........................ 202311173649.9

(51) Int. Cl.
*G01N 9/24* (2006.01)
*G01N 23/02* (2006.01)
(Continued)

(52) U.S. Cl.
CPC ............... *G01N 9/24* (2013.01); *G01N 23/02* (2013.01); *G01N 23/083* (2013.01); *G01N 23/18* (2013.01)

(58) Field of Classification Search
CPC ........ G01N 9/24; G01N 23/02; G01N 23/083; G01N 23/18
See application file for complete search history.

(56) References Cited

FOREIGN PATENT DOCUMENTS

| | | |
|---|---|---|
| CN | 115015039 A | 9/2022 |
| CN | 115096756 A | 9/2022 |

(Continued)

OTHER PUBLICATIONS

CN 115683937 and its English translation (Year: 2023).*
CN 118090515 A and its English translation (Year: 2024).*
CN 118130310 A and its English translation (Year: 2024).*

*Primary Examiner* — Chih-Cheng Kao

(57) ABSTRACT

The present disclosure relates to a surface density full-detection method and system. The method comprises: (1) measuring a zero point; (2) calibrating a target detection object; (3) actual line scanning measurement; (4) determining an actual size; and (5) error correction. The surface density full-detection system comprises a radiation source, a linear array detector and a processor, the radiation source and the linear array detector are relatively fixed, a sample to be detected is placed between the radiation source and the linear array detector and can move relative to the radiation source and the linear array detector, and when the radiation source and the linear array detector are used for linear scanning full-detection, the sample to be detected can be detected through the processor. Point scanning reciprocating motion in the breadth direction is not needed, and the stability of the detection effect is improved while all detection is performed.

20 Claims, 6 Drawing Sheets

(51) Int. Cl.
*G01N 23/083* (2018.01)
*G01N 23/18* (2018.01)

(56) References Cited

FOREIGN PATENT DOCUMENTS

| | | | |
|---|---|---|---|
| CN | 115683937 | A | 2/2023 |
| CN | 117214206 | A | 12/2023 |
| JP | 2006300888 | A | 11/2006 |

* cited by examiner

SURFACE DENSITY FULL-DETECTION METHOD AND SYSTEM

CROSS-REFERENCE TO RELATED APPLICATIONS

This application is a bypass continuation application of PCT application no.: PCT/CN2024/131630. This application claims priorities from PCT Application PCT/CN2024/131630, filed Nov. 12, 2024, and from Chinese patent application 202311173649.9, filed Sep. 12, 2023, the contents of which are incorporated herein in the entirety by reference.

TECHNICAL FIELD

The present disclosure relates to the technical field of surface density detection, and in particular to a surface density full-detection method and system.

BACKGROUND

With the gradual improvement on the requirements for industrial intelligent manufacturing, the demand for product quality and safety is becoming higher and higher. Conventional X/β-ray thickness gauges can only perform Z-shaped scanning sampling detection on pole pieces, metal foil materials, plastic films, paper, metal sheets, etc. in a manner of reciprocating motion in a breadth direction. In this way, the undetected areas on the detection object account for a vast majority. If there is unqualified surface density/thickness in these areas, conventional thickness gauges cannot detect the defect, and the detection object is still considered to meet the standards, which will have a serious impact on product quality and further pose great hidden risks to subsequent production processes or final products. Therefore, for the production process of pole pieces, foil materials, films, and other materials that require high consistency in thickness/surface density, it is essential to perform full detection data on all thickness/surface density distribution of detection objects.

SUMMARY

An objective of the present disclosure is to provide a surface density full-detection method and system, in order to solve the product quality problem caused by unqualified surface density/thickness in undetected areas of detection objects in the above sampling background.

In order to realize the above objective, the present disclosure provides the following technical solution: a surface density full-detection method includes the following steps:

(1) measuring a zero point: a radiation source emits rays to a linear array detector, the linear array detector includes a plurality of pixel detectors, and each pixel detector of the linear array detector detects a primary intensity of the rays to reach the detector through the air;

(2) calibrating a target detection object: a sample with known surface density is placed in a position for a detection object, rays emitted from the radiation source penetrate the sample with known surface density to reach the linear array detector, a correspondence between the surface density of the sample with known surface density and a measuring signal is obtained according to the attenuation law of ray beams, and a calibration model is determined;

(3) actual line scanning measurement: a sample to be detected is placed between the radiation source and the linear array detector, the radiation source and the linear array detector are relatively fixed, the sample to be detected moves relative to the radiation source and the linear array detector, the radiation source irradiates on the sample to be detected to form light spots covering its entire breadth, the rays emitted from the radiation source penetrate the sample to be detected to reach the linear array detector, the linear array detector outputs an attenuated two-dimensional signal, and the two-dimensional surface density distribution data of the sample to be detected is obtained according to the zero point and the calibration model of each pixel detector of the linear array detector;

(4) determining an actual size: a corresponding actual size of the single surface density data detected by each pixel detector of the linear array detector is determined in a breadth direction and a running direction, and a two-dimensional actual size of the sample corresponding to the two-dimensional surface density distribution data is further obtained; and (5) error correction: this step includes keeping the relative position of the radiation source and the linear array detector unchanged, removing the detection object from a running area, and measuring and updating the real-time zero point; and keeping the relative position of the radiation source and the linear array detector unchanged, removing the detection object from the running area, and correcting detection results through a measurement standard sheet.

Further, in the step (2), the attenuation law of ray beams is represented by the following formula:

$$I = I_0 * e^{-\lambda m}$$

where $I_0$ is a primary intensity of rays measured in step (1), I is an intensity of the rays penetrating the sample with known surface density as measured in step (2), λ is an attenuation coefficient of the sample with known surface density in unit surface density to such rays, and m is a surface density;

thus, a calculation formula of the surface density m in step (3) is:

$$m = \frac{1}{\lambda} * \ln\left(\frac{I_0}{I}\right).$$

Further, the surface density of each pixel detector of the linear array detector and the measuring signal are fitted by a polynomial using a least square method, where a fitting correlation coefficient $R^2 > 0.995$.

Further, in the step (4), the corresponding actual size of the single surface density data detected by each pixel detector in the running direction is a running speed/sampling frequency.

Further, in the step (4), the corresponding actual size of the single surface density data detected by each pixel detector in the breadth direction is a signal pixel interval size of the linear array detector.

Further, in the step (4), the corresponding actual size of the single surface density data detected by each pixel detector in the breadth direction is:

$$d = \frac{d_0}{f},$$

$$f = \frac{h_1}{h_2},$$

where d is a corresponding actual size of the sample to be detected in the breadth direction, $d_0$ is a single pixel interval size of the linear array detector, f is a magnification ratio, $h_1$ is a distance from a focus of the radiation source to the linear array detector, and $h_2$ is a distance from the focus of the radiation source to the sample to be detected.

A surface density full-detection system includes:

a radiation source; the radiation source is an X/β radiation source;

a linear array detector, including a plurality of pixel detectors, and configured to receive rays emitted from the radiation source and output an attenuated two-dimensional signal;

a collimating grid, configured to collimate the rays emitted from the radiation source; a single interval of the collimating grid corresponds to a single pixel size of the linear array detector; and a processor, configured to receive the two-dimensional signal outputted by the linear array detector, calculate and obtain the two-dimensional surface density distribution data of the sample to be detected according to the zero point and calibration model of each pixel detector of the linear array detector, and determine the corresponding actual size of the single surface density data detected by each pixel detector of the linear array detector in the breadth direction and the running direction;

the radiation source and the linear array detector are relatively fixed, a sample to be detected is placed between the radiation source and the linear array detector and can move relative to the radiation source and the linear array detector.

A surface density full-detection system includes:

a radiation source; the radiation source is an X/β ray distribution source, the X/β ray distribution source includes an encapsulating shell and a plurality of X/β ray divergence sources distributed in the encapsulating shell, and a divergence shape of the rays emitted from the X/β ray divergence sources is constrained to be fan-shaped by their own source windows;

a linear array detector, including a plurality of pixel detectors, and configured to receive rays emitted from the radiation source and output an attenuated two-dimensional signal; and a plurality of areas irradiated by the X/β ray divergence sources are correspondingly received and detected by single pixels of the linear array detector; and a processor, configured to receive the two-dimensional signal outputted by the linear array detector, calculate and obtain the two-dimensional surface density distribution data of the sample to be detected according to the zero point and calibration model of each pixel detector of the linear array detector, and determine the corresponding actual size of the single surface density data detected by each pixel detector of the linear array detector in the breadth direction and the running direction;

the radiation source and the linear array detector are relatively fixed, a sample to be detected is placed between the radiation source and the linear array detector and can move relative to the radiation source and the linear array detector.

A surface density full-detection system includes:

a radiation source; the radiation source is an X/β ray divergence source, and a divergence shape of the rays emitted from the X/β ray divergence source is constrained to be fan-shaped by its own source window;

a linear array detector, including a plurality of pixel detectors, and configured to receive rays emitted from the radiation source and output an attenuated two-dimensional signal;

a processor, configured to receive the two-dimensional signal outputted by the linear array detector, calculate and obtain the two-dimensional surface density distribution data of the sample to be detected according to the zero point and calibration model of each pixel detector of the linear array detector, and determine the corresponding actual size of the single surface density data detected by each pixel detector of the linear array detector in the breadth direction and the running direction;

the radiation source and the linear array detector are relatively fixed, a sample to be detected is placed between the radiation source and the linear array detector, and can move relative to the radiation source and the linear array detector.

Further, the X/β ray divergence source constrains the rays into ray beams reaching the linear array detector through an additional trapezoidal collimator.

Compared with the prior art, the present disclosure has the beneficial effects that: according to the surface density full-detection method and the system thereof, (1) the surface density full detection can be performed for lithium electrode slices and substrate films; compared to horizontal scanning sampling, the measurement system is more stable without missed detection conditions, the marks of abnormal locations of surface density can be removed, and the product quality in the consistency of surface density distribution and the consistency of total amount is significantly improved, and segmented lithium electrode slices can be sorted to enhance the battery consistency;

(2) the measurement data of the surface density full detection is fed back to a coating die or substrate film production equipment in the previous process for real-time adjustment of production process parameters, increase the support data for closed-loop adjustment, and fully utilize the role of closed-loop adjustment;

(3) the spatial resolution in the breadth direction and the spatial resolution in the running direction of surface density detection are improved; in actual linear scanning measurements, no mechanical motion device is needed for scanning, so that the stability of on-line operation of the equipment can be enhanced, and the stability of surface density inspection can be increased;

(4) the present disclosure assists in the development of lithium battery production towards high capacity, high density and high speed, including but not limited to improving the properties of lithium batteries in the physical properties, stability and uniformity of electrode sheets;

(5) the surface density full-detection system composed of an X/β radiation source and a linear array detector achieves better spatial resolution and the best accuracy in the surface density full detection, but has poor economic efficiency. It is applicable for scenarios with high requirements for detection effects;

(6) the surface density full-detection system composed of an X/β ray distribution source and a linear array detector has moderate spatial resolution, better accuracy and moderate economic efficiency. It is applicable for scenarios with balanced requirements in all aspects;

(7) the surface density full-detection system composed of an X/β ray divergence source and a linear array detector achieves the highest spatial resolution, moderate accuracy and better economic efficiency. It is applicable for scenarios with high requirements for economic efficiency; and (8) according to the detection requirements of a detection object, an appropriate full-detection system can be selected, so that the application scenarios of the surface density full-detection method proposed in the present disclosure are expanded, and the practicality of the method is increased. Whichever system is chosen, the beneficial effects described in (1)-(4) listed above can be achieved.

In the figures, 101. radiation source; 102. sample to be detected; 103. collimating grid; 104. linear array detector; 201. radiation source; 202. sample to be detected; 203. linear array detector; 301. radiation source; 302. sample to be detected; 303. linear array detector.

DETAILED DESCRIPTION OF EMBODIMENTS

The technical solutions in the embodiments of the present disclosure will be clearly and completely described below in combination with the accompanying drawings in the embodiments of the present disclosure. Apparently, the embodiments described are only a part of, rather than all of, the embodiments of the present disclosure. All other embodiments acquired by those of ordinary skill in the art without making creative efforts based on the embodiments of the present disclosure should fall into the protection scope of the present disclosure.

Figure 1:
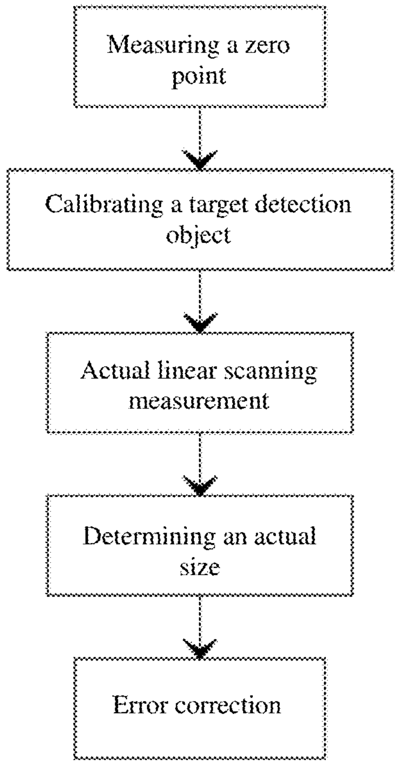
FIG. 1 is a flow chart of a surface density full-detection method of the present disclosure.

With reference to FIG. 1, a surface density full-detection method includes the following steps:

(1) measuring a zero point: a radiation source emits rays to a linear array detector, the linear array detector includes a plurality of pixel detectors, and each pixel detector of the linear array detector detects a primary intensity of the rays to reach the detector through the air;

(2) calibrating a target detection object: a sample with known surface density is placed in a position for a detection object, rays emitted from the radiation source penetrate the sample with known surface density to reach the linear array detector, a correspondence between the surface density of the sample with known surface density and a measuring signal is obtained according to the attenuation law of ray beams, and a calibration model is determined;

(3) actual line scanning measurement: a sample to be detected is placed between the radiation source and the linear array detector, the radiation source and the linear array detector are relatively fixed, the sample to be detected moves relative to the radiation source and the linear array detector, the radiation source irradiates on the sample to be detected to form light spots covering its entire breadth, the rays emitted from the radiation source penetrate the sample to be detected to reach the linear array detector, the linear array detector outputs an attenuated two-dimensional signal, and the two-dimensional surface density distribution data of the sample to be detected is obtained according to the zero point, the two-dimensional signal and the calibration model of each pixel detector of the linear array detector;

(4) determining an actual size: a corresponding actual size of the single surface density data detected by each pixel detector of the linear array detector is determined in a breadth direction and a running direction, and a two-dimensional actual size of the sample corresponding to the two-dimensional surface density distribution data is further obtained; and (5) error correction: this step includes keeping the relative position of the radiation source and the linear array detector unchanged, removing the detection object from a running area, and measuring the real-time zero point; and keeping the relative position of the radiation source and the linear array detector unchanged, removing the detection object from the running area, and correcting detection results through a measurement standard sheet.

For measuring surface density/thickness using X/β rays, the principle lies in the attenuation law of ray beams when the rays penetrate through objects of different arcal densities/thicknesses.

In the step (2), the attenuation law of ray beams is represented by the following formula:

$$I = I_0 * e^{-\lambda m}$$

where $I_0$ is a primary intensity of rays measured in step (1), I is an intensity of the rays penetrating the sample with known surface density as measured in step (2), λ is an attenuation coefficient of the sample with known surface density in unit surface density to such rays, and m is a surface density; since m is a known value, the specific value of λ can be calculated to obtain the calibration model;

thus, a calculation formula of the surface density m in step (3) is:

$$m=\frac{1}{\lambda}*\ln\left(\frac{I_0}{I}\right);$$

Therefore, there is a linear relation between the measuring signal and the surface density m, but such case is applicable for ray beams of single energy; for X/β rays of continuous energy spectrum in actual cases, owing to the phenomenon of ray beam hardening after penetrating through an object, the surface density and the measuring signal are not in a complete linear relation in a greater inspection range of surface density, as a result, it is necessary to fit the surface density of each pixel detector of the linear array detector and the measuring signal by a polynomial using a least square method, where a fitting correlation coefficient $R^2>0.995$; each pixel of the ray linear array detector is calibrated, and the zero point $I_0$ corresponding to each pixel and the calibration relation of each pixel in step (2) are stored;

In actual cases, a surface density full inspector needs to work uninterruptedly for 7*24 h, the $I_0$ in the step of measuring a zero point will change along with the changes in the temperature, humidity and air density of the equipment environment, accordingly causing an influence on the measuring signal $$\ln\left(\frac{I_0}{I}\right),$$

and finally resulting in an error in the inspection result of surface density, and thus error correction is needed;

Specifically, the error correction includes the following steps: keeping the relative positions of the radiation source and the linear array detector by setting a time interval of no less than 1 h, removing the detection object away from the running area, measuring a real-time zero point, or measuring the real-time temperature, humidity and air density using a sensor, and correcting the zero point in real time using a correction model;

keeping the relative positions of the radiation source and the linear array detector by setting a time interval of no less than 24 h, removing the detection object away from the running area, and correcting detection results through a measurement standard sheet;

In step (4), the corresponding actual size of the single surface density data detected by each pixel detector in the running direction is a running speed/sampling frequency; specifically, the running direction is a moving direction of the sample to be detected;

In step (5), the relative positions of the radiation source and the linear array detector are kept unchanged, the radiation source and the linear array detector are removed from the running area of the detection object, and the real-time zero point is measured at an time interval of no less than 1 h; and the relative positions of the radiation source and the linear array detector are kept unchanged, then the radiation source and the linear array detector are removed from the running area of the detection object, and the detection results are corrected through the measurement standard sheet at an time interval of no less than 24 h.

Embodiment 1

Figure 2:
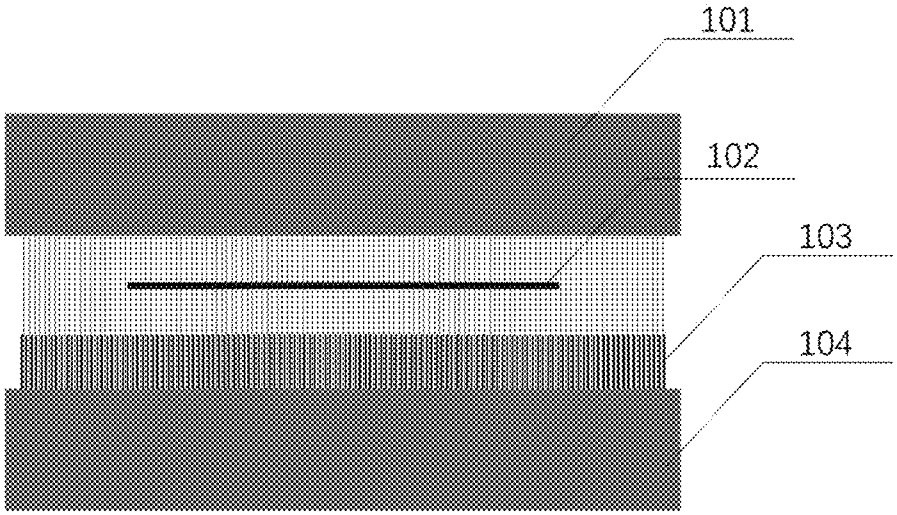
FIG. 2 is a structural diagram of a surface density full-detection system in embodiment 1 of the present disclosure.

With reference to FIG. 2, in the embodiment, a radiation source is an X/β radiation source, the β radiation source can be specifically a Kr85, an Sr90, an electronic accelerator, etc., and a linear array detector 104 can be a type of any of gas ionization chamber detector, scintillator detector and semiconductor detector; according to the different types of energy of measured rays, an appropriate detector type as well as a material type and size will be selected based on detection requirements, and a single pixel size is between mm-cm; a collimating grid 103 is placed at the top of the linear array detector 104 to collimate the rays emitted from the radiation source 101, allowing the rays to enter the linear array detector 104 vertically; the collimating grid 103 is made of heavy metal materials or alloys such as lead and tungsten, with individual intervals between mm-cm, and the individual intervals of the collimating grid 103 correspond to single pixel sizes of the linear array detector 104; and a sample 102 to-be detected is placed between the radiation source 101 and the collimating grid 103, and the sample 102 to-be detected can be specifically a lithium electrode sheet, a metal foil, a polymer film, a foil used in the production and manufacturing of new batteries, etc.;

in step (4), the actual size corresponding to the single surface density data detected by each pixel detector in the breadth direction is a signal pixel interval size of the linear array detector 104.

With reference to FIG. 2, a surface density full-detection system applied to the surface density full-detection method is provided in the embodiment, including:

a radiation source 101, configured to emit rays; the radiation source 101 includes a plurality of X/β radiation sources in continuous arrangement, and the β radiation sources can be specifically Kr85, Sr90, electronic accelerators, etc.;

a linear array detector 104, including a plurality of pixel detectors, and configured to receive rays emitted from the radiation source 101 and output an attenuated two-dimensional signal; the linear array detector 104 can be a type of any of gas ionization chamber detector, scintillator detector and semiconductor detector;

a collimating grid 103, configured to collimate the rays emitted from the radiation source 101; a single interval of the collimating grid 103 corresponds to a single pixel size of the linear array detector 104; and a processor, configured to receive the two-dimensional signal outputted by the linear array detector 104, calculate and obtain the two-dimensional surface density distribution data of the sample to be detected 102 according to the zero point, the two-dimensional signal and calibration model of each pixel detector of the linear array detector 104, and determine the corresponding actual size of the single surface density data detected by each pixel detector of the linear array detector 104 in the breadth direction and the running direction;

the radiation source 101 and the linear array detector 104 are relatively fixed, a sample to be detected 102 is placed between the radiation source 101 and the linear array detector 104 and can move relative to the radiation source 101 and the linear array detector 104.

Embodiment 2

Figure 3:
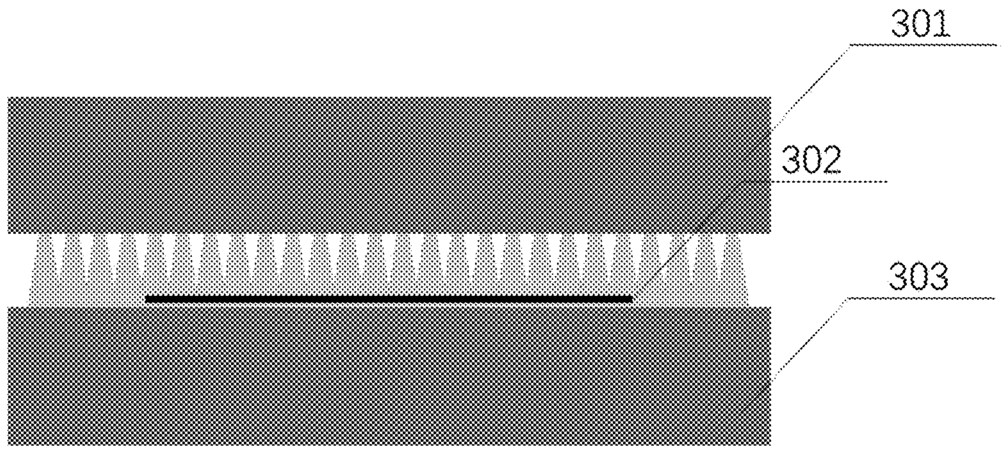
FIG. 3 is a structural diagram of a surface density full-detection system in embodiment 2 of the present disclosure.

With reference to FIG. 3, the embodiment is different from embodiment 1 in that a radiation source 301 is an X/β ray distribution source, the X/β ray distribution source includes an encapsulating shell and a plurality of X/β ray divergence sources distributed in the encapsulating shell, and a divergence shape of the rays emitted from the X/β ray divergence sources is constrained to be fan-shaped by their own source windows; and the areas irradiated by the X/β ray divergence sources are correspondingly received and detected by single pixels of the linear array detector 303, the linear array detector 303 is in a size of mm-cm level, and a sample to be detected 302 is placed between the radiation source 301 and the linear array detector 303.

in step (4), the actual size corresponding to the single surface density data detected by each pixel detector in the breadth direction is the signal pixel interval size of the linear array detector 303.

With reference to FIG. 3, a surface density full-detection system applied to the surface density full-detection method is provided in the embodiment, including:

- a radiation source 301, configured to emit rays, and including an encapsulating shell and a plurality of X/β ray divergence sources distributed in the encapsulating shell;
- a linear array detector 303, including a plurality of pixel detectors, and configured to receive rays emitted from the radiation source 301 and output an attenuated two-dimensional signal;
- a processor, configured to receive the two-dimensional signal outputted by the linear array detector 303, calculate and obtain the two-dimensional surface density distribution data of the sample to be detected 302 according to the zero point, the two-dimensional signal and calibration model of each pixel detector of the linear array detector 303, and determine the corresponding actual size of the single surface density data detected by each pixel detector of the linear array detector 303 in the breadth direction and the running direction;
- the radiation source 301 and the linear array detector 303 are relatively fixed, the sample to be detected 302 is placed between the radiation source 301 and the linear array detector 303 and can move relative to the radiation source 301 and the linear array detector 303.

Embodiment 3

Figure 4:
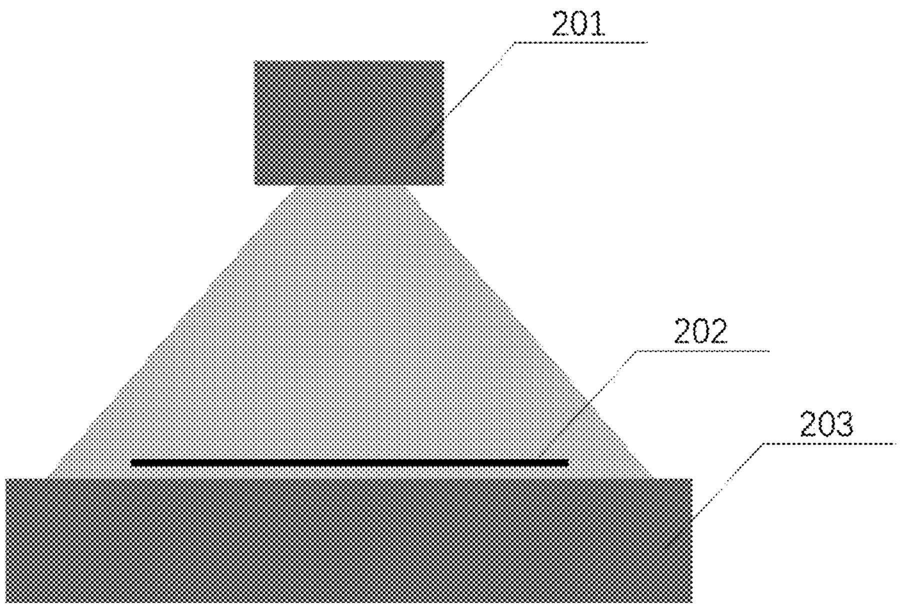
FIG. 4 is a structural diagram of a surface density full-detection system in embodiment 3 of the present disclosure.

With reference to FIG. 4, the embodiment is different from embodiment 1 in that a radiation source 201 is an X/β ray divergence source, a divergence shape of the rays emitted from the X/β ray divergence source is constrained to be fan-shaped by its own source window, or the X/β ray divergence source constrains the rays into ray beams reaching the linear array detector 203 through an additional trapezoidal collimator; the additional collimator is made of heavy metal materials or alloys such as lead and tungsten and used for adjusting a size of the fan-shaped ray beam; a sample 202 to-be detected is placed between the radiation source 201 and the linear array detector 203, and a single pixel size of the linear array detector 203 can range from dozens of microns to cm since it is not limited by the size of a collimating grid;

Because the fan-shaped ray beams have a certain magnification ratio, the corresponding actual size of the sample 202 to be detected in a breadth direction in step (4) is:

$$d = \frac{d_0}{f},$$

$$f = \frac{h_1}{h_2},$$

where d is a corresponding actual size of the sample 202 to be detected in the breadth direction, $d_0$ is a single pixel interval size of the linear array detector 203, f is a magnification ratio, $h_1$ is a distance from a focus of the radiation source 201 to the linear array detector 203, and $h_2$ is a distance from the focus of the radiation source 201 to the sample 202 to be detected.

With reference to FIG. 4, a surface density full-detection system applied to the surface density full-detection method is provided in the embodiment, including:

- a radiation source 201, configured to emit rays; a divergence shape of the emitted rays is constrained to be fan-shaped by its own source window, or the rays are constrained into ray beams reaching the linear array detector 203 through an additional trapezoidal collimator;
- a linear array detector 203, including a plurality of pixel detectors, configured to receive rays emitted from the radiation source and output an attenuated two-dimensional signal; and areas irradiated by an X/β ray divergence source are correspondingly received and detected by single pixels of the linear array detector 203; and
- a processor, configured to receive the two-dimensional signal outputted by the linear array detector 203, calculate and obtain the two-dimensional surface density distribution data of the sample to be detected 202 according to the zero point, the two-dimensional signal and calibration model of each pixel detector of the linear array detector 203, and determine the corresponding actual size of the single surface density data detected by each pixel detector of the linear array detector 203 in the breadth direction and the running direction;
- the radiation source 201 and the linear array detector 203 are relatively fixed, a sample to be detected 202 is placed between the radiation source 201 and the linear array detector 203 and can move relative to the radiation source 201 and the linear array detector 203.

With reference to FIGS. 5-8, the embodiment will be described below in combination with specific products.

Figure 5:
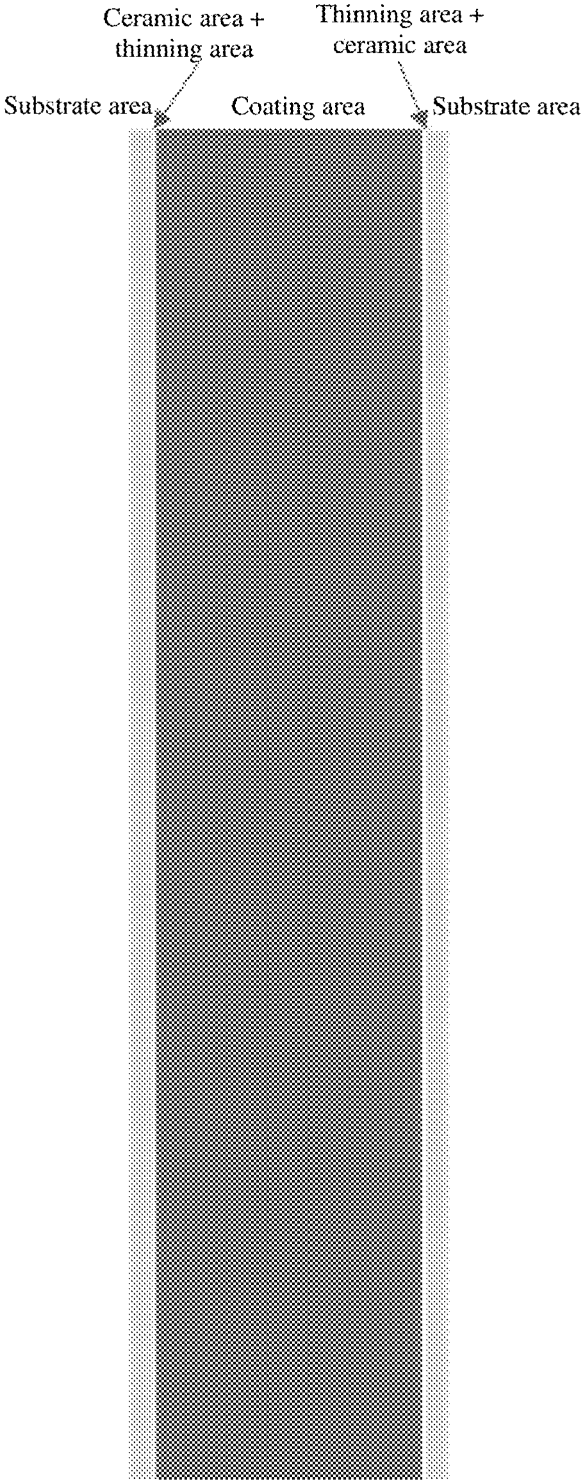
FIG. 5 is a structural diagram of a positive polar piece in embodiment 3 of the present disclosure.
Figure 6:
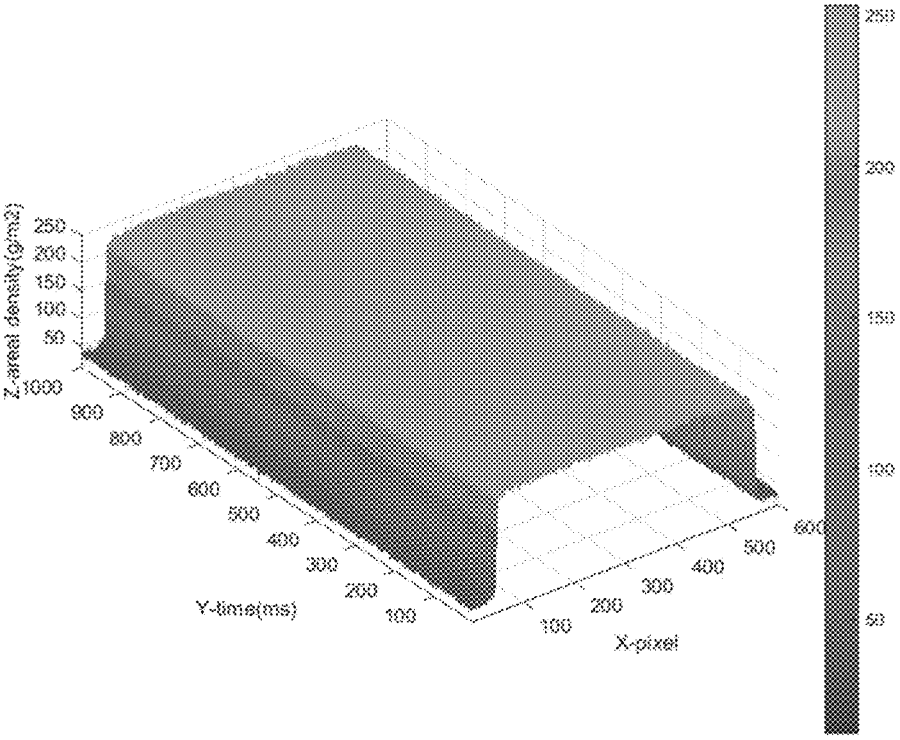
FIG. 6 is a three-dimensional demonstrative effect of the surface density full detection of the positive polar piece in embodiment 3 of the present disclosure.
Figure 7:
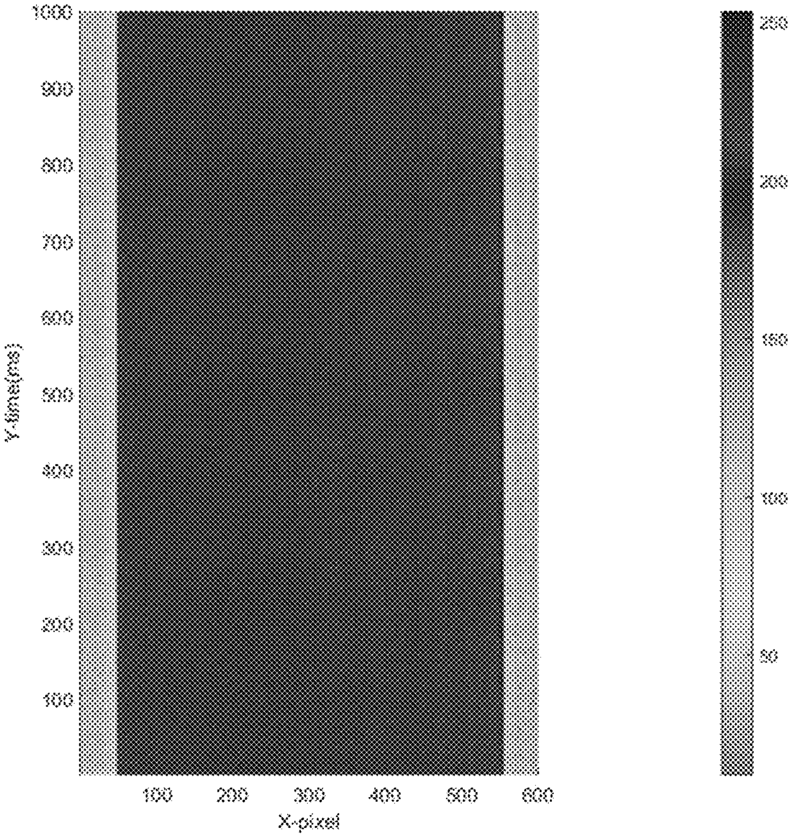
FIG. 7 is a two-dimensional demonstrative effect of the surface density full detection of the positive polar piece in embodiment 3 of the present disclosure.

With reference to FIG. 5, a positive polar piece has a substrate area, a ceramic area, a thinning area, a coating area, a thinning area, a ceramic area, and a substrate area from left to right in order; the positive polar piece passes through the radiation source and the linear array detector at a running speed of 1 m/s, with a measurement time of 1 s, and the detected results of surface density can be displayed in three-dimensional and two-dimensional formats, as shown in FIGS. 6 and 7, respectively. In FIG. 6, the X axis represents the breadth direction, and each pixel sensor of the linear array detector has an output; the Y axis represents the running direction, with an output every ms; the Z axis represents the surface density value, measured in $g/m^2$, the height on the Z axis reflects the size of the surface density, the surface density value is indicated by a color bar, and different color bars can be selected. In FIG. 7, the X axis represents the breadth direction and the Y axis represents the running direction, namely the projection of FIG. 6 on the XY plane, and the surface density values are directly displayed in a color chart.

Figure 8:
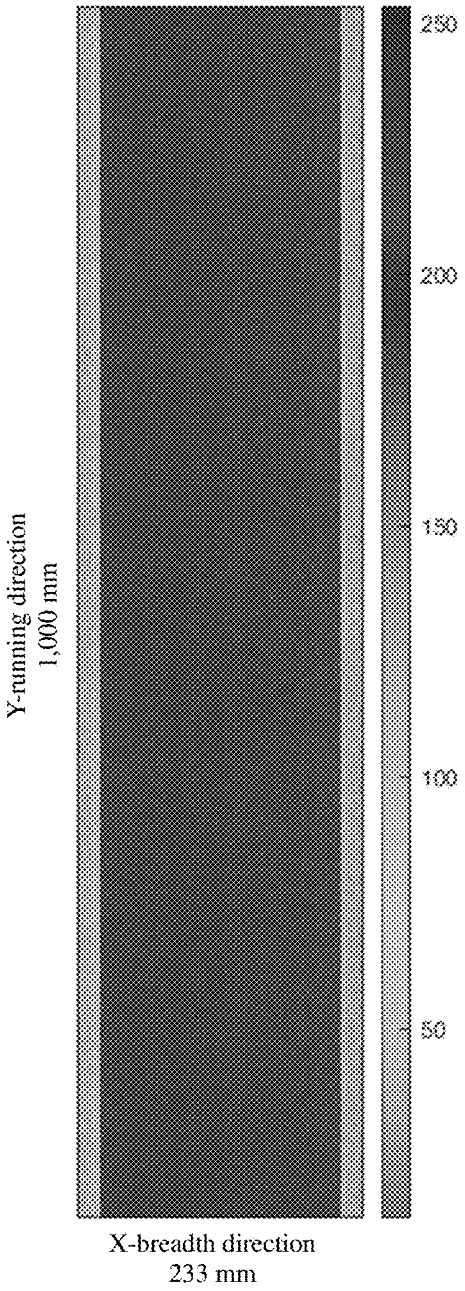
FIG. 8 is a two-dimensional distribution diagram of the positive polar plate in embodiment 3 of the present disclosure.

In the results of surface density full detection as shown in FIG. 7, from left to right, there is a substrate area, a ceramic area, a thinning area, a coating area, a thinning area, a ceramic area and a substrate area in sequence. The two-dimensional distribution of surface density as shown in FIG. 7 is restored to the two-dimensional distribution in actual sizes, and the display results are as shown in FIG. 8. The X axis represents the breadth direction, with the actual size of 233 mm, and the Y axis represents the running direction, with the running speed of 1 m/s, the detection time of 1 s, and the actual size of 1,000 mm.

The surface density full-detection method and the system thereof provided by the above embodiments have the following beneficial effects:

(1) the surface density full detection can be performed for lithium electrode slices and substrate films; compared to horizontal scanning sampling, the measurement system is more stable without missed detections, the marks of abnormal locations of surface density can be removed, and the product quality in the consistency of surface density distribution and the consistency of total amount is significantly improved, and segmented lithium electrode sheets can be sorted to enhance the battery consistency;

(2) the measurement data of the surface density full detection is fed back to a coating die or substrate film production equipment in the previous process for real-time adjustment of production process parameters, increase the support data for closed-loop adjustment, and fully utilize the role of closed-loop adjustment;

(3) the spatial resolution in the breadth direction and the spatial resolution in the running direction of surface density inspection are improved; in actual linear scanning measurements, no mechanical motion device is needed for scanning, so that the stability of on-line operation of the equipment can be enhanced, and the stability of surface density inspection can be increased;

(4) the present disclosure assists in the development of lithium battery production towards high capacity, high density and high speed, including but not limited to improving the properties of lithium batteries in the physical properties, stability and uniformity of electrode sheets;

(5) the surface density full-detection system composed of an X/β radiation source and a linear array detector achieves better spatial resolution and the best accuracy in the surface density full detection, but has poor economic efficiency. It is applicable for scenarios with high requirements for detection effects;

(6) the surface density full-detection system composed of an X/β ray distribution source and a linear array detector has moderate spatial resolution, better accuracy and moderate economic efficiency. It is applicable for scenarios with balanced requirements in all aspects;

(7) the surface density full-detection system composed of an X/β ray divergence source and a linear array detector achieves the highest spatial resolution, moderate accuracy and better economic efficiency. It is applicable for scenarios with high requirements for economic efficiency; and (8) according to the detection requirements of a detection object, an appropriate full-inspection system can be selected, so that the application scenarios of the surface density full-detection method proposed in the present disclosure are expanded, and the practicality of the method is increased. Whichever system is chosen, the beneficial effects described in (1)-(4) listed above can be achieved.

For those skilled in the art, it is obvious that the present disclosure is not limited to the details of the above exemplary embodiments, and the present disclosure can be implemented in other specific forms under the situation of not deviating from the spirit or basic features of the present disclosure. Therefore, from any point of view, the embodiments should be regarded as exemplary and non-limiting. The scope of the present disclosure is defined by the attached claims rather than the above descriptions, and thus it is intended to include all the changes that fall in the meaning and scope of the equivalent elements of the claims in the present disclosure. Any drawing signs in the claims should not be regarded as claims involved in the limitation.

The invention claimed is:

1. A surface density full-detection method, comprising the following steps:

(1) measuring a zero point: a radiation source emits rays to a linear array detector, the linear array detector comprises a plurality of pixel detectors, and each pixel detector of the linear array detector detects a primary intensity of the rays to reach the detector through the air;

(2) calibrating a target detection object: a sample with known surface density is placed in a position for a detection object, rays emitted from the radiation source penetrate the sample with known surface density to reach the linear array detector, a correspondence between the surface density of the sample with known surface density and a measuring signal is obtained according to the attenuation law of ray beams, and a calibration model is determined;

(3) actual line scanning measurement: a sample to be detected is placed between the radiation source and the linear array detector, the radiation source and the linear array detector are relatively fixed, the sample to be detected moves relative to the radiation source and the linear array detector, the radiation source irradiates on the sample to be detected to form light spots covering its entire breadth, the rays emitted from the radiation source penetrate the sample to be detected to reach the linear array detector, the linear array detector outputs an attenuated two-dimensional signal, and the two-dimensional surface density distribution data of the sample to be detected is obtained according to the zero point and the calibration model of each pixel detector of the linear array detector;

(4) determining an actual size: a corresponding actual size of the single surface density data detected by each pixel detector of the linear array detector is determined in a breadth direction and a running direction, and a two-dimensional actual size of the sample corresponding to the two-dimensional surface density distribution data is further obtained; and (5) error correction: this step comprises keeping the relative position of the radiation source and the linear array detector unchanged, removing the detection object from a running area, and measuring and updating the real-time zero point; and keeping the relative position of the radiation source and the linear array detector unchanged, removing the detection object from the running area, and correcting detection results through a measurement standard sheet.

2. The surface density full-detection method according to claim 1, wherein in the step (2), the attenuation law of ray beams is represented by the following formula:

$$I = I_0 * e^{-\lambda m}$$

where $I_0$ is a primary intensity of rays measured in step (1), I is an intensity of the rays penetrating the sample with known surface density as measured in step (2), λ is an attenuation coefficient of the sample with known surface density in unit surface density to such rays, and m is a surface density;

thus, a calculation formula of the surface density m in step (3) is:

$$m = \frac{1}{\lambda} * \ln\left(\frac{I_0}{I}\right).$$

3. The surface density full-detection method according to claim 2, wherein the surface density of each pixel detector of the linear array detector and the measuring signal are fitted by a polynomial using a least square method, where a fitting correlation coefficient $R^2>0.995$.

4. The surface density full-detection method according to claim 1, wherein in the step (4), the corresponding actual size of the single surface density data detected by each pixel detector in the running direction is a running speed/sampling frequency.

5. The surface density full-detection method according to claim 1, wherein in the step (4), the corresponding actual size of the single surface density data detected by each pixel detector in the breadth direction is a signal pixel interval size of the linear array detector.

6. The surface density full-detection method according to claim 2, wherein in the step (4), the corresponding actual size of the single surface density data detected by each pixel detector in the breadth direction is a signal pixel interval size of the linear array detector.

7. The surface density full-detection method according to claim 3, wherein in the step (4), the corresponding actual size of the single surface density data detected by each pixel detector in the breadth direction is a signal pixel interval size of the linear array detector.

8. The surface density full-detection method according to claim 4, wherein in the step (4), the corresponding actual size of the single surface density data detected by each pixel detector in the breadth direction is a signal pixel interval size of the linear array detector.

9. The surface density full-detection method according to claim 1, wherein in the step (4), the corresponding actual size of the single surface density data detected by each pixel detector in the breadth direction is:

$$d = \frac{d_0}{f},$$

$$f = \frac{h_1}{h_2},$$

where d is a corresponding actual size of the sample to be detected in the breadth direction, $d_0$ is a single pixel interval size of the linear array detector, f is a magnification ratio, $h_1$ is a distance from a focus of the radiation source to the linear array detector, and $h_2$ is a distance from the focus of the radiation source to the sample to be detected.

10. The surface density full-detection method according to claim 2, wherein in the step (4), the corresponding actual size of the single surface density data detected by each pixel detector in the breadth direction is:

$$d = \frac{d_0}{f},$$

-continued $$f = \frac{h_1}{h_2},$$

where d is a corresponding actual size of the sample to be detected in the breadth direction, $d_0$ is a single pixel interval size of the linear array detector, f is a magnification ratio, $h_1$ is a distance from a focus of the radiation source to the linear array detector, and $h_2$ is a distance from the focus of the radiation source to the sample to be detected.

11. The surface density full-detection method according to claim 3, wherein in the step (4), the corresponding actual size of the single surface density data detected by each pixel detector in the breadth direction is:

$$d = \frac{d_0}{f},$$

$$f = \frac{h_1}{h_2},$$

where d is a corresponding actual size of the sample to be detected in the breadth direction, $d_0$ is a single pixel interval size of the linear array detector, f is a magnification ratio, $h_1$ is a distance from a focus of the radiation source to the linear array detector, and $h_2$ is a distance from the focus of the radiation source to the sample to be detected.

12. The surface density full-detection method according to claim 4, wherein in the step (4), the corresponding actual size of the single surface density data detected by each pixel detector in the breadth direction is:

$$d = \frac{d_0}{f},$$

$$f = \frac{h_1}{h_2},$$

where d is a corresponding actual size of the sample to be detected in the breadth direction, $d_0$ is a single pixel interval size of the linear array detector, f is a magnification ratio, $h_1$ is a distance from a focus of the radiation source to the linear array detector, and $h_2$ is a distance from the focus of the radiation source to the sample to be detected.

13. A surface density full-detection system applied to the surface density full-detection method according to claim 1, comprising:

a radiation source; and the ray source is an X/β radiation source;

a linear array detector, comprising a plurality of pixel detectors, and configured to receive rays emitted from the radiation source and output an attenuated two-dimensional signal;

a collimating grid, configured to collimate the rays emitted from the radiation source; a single interval of the collimating grid corresponds to a single pixel size of the linear array detector; and a processor, configured to receive the two-dimensional signal outputted by the linear array detector, calculate and obtain the two-dimensional surface density distribution data of the sample to be detected according to the zero point and calibration model of each pixel detector of the linear array detector, and determine the corresponding actual size of the single surface density data detected by each pixel detector of the linear array detector in the breadth direction and the running direction;

the radiation source and the linear array detector are relatively fixed, a sample to be detected is placed between the radiation source and the linear array detector and can move relative to the radiation source and the linear array detector.

14. The surface density full-detection system of claim 13, wherein in the step (2), the attenuation law of ray beams is represented by the following formula:

$$I = I_0 * e^{-\lambda m}$$

where $I_0$ is a primary intensity of rays measured in step (1), I is an intensity of the rays penetrating the sample with known surface density as measured in step (2), λ is an attenuation coefficient of the sample with known surface density in unit surface density to such rays, and m is a surface density;

thus, a calculation formula of the surface density m in step (3) is:

$$m = \frac{1}{\lambda} * \ln\left(\frac{I_0}{I}\right).$$

15. The surface density full-detection system of claim 14, wherein the surface density of each pixel detector of the linear array detector and the measuring signal are fitted by a polynomial using a least square method, where a fitting correlation coefficient $R^2>0.995$.

16. The surface density full-detection system of claim 13, wherein in the step (4), the corresponding actual size of the single surface density data detected by each pixel detector in the running direction is a running speed/sampling frequency.

17. The surface density full-detection system of claim 13, wherein in the step (4), the corresponding actual size of the single surface density data detected by each pixel detector in the breadth direction is a signal pixel interval size of the linear array detector.

18. A surface density full-detection system applied to the surface density full-detection method according to claim 1, comprising:

a radiation source; the radiation source is an X/β ray distribution source, the X/β ray distribution source comprises an encapsulating shell and a plurality of X/β ray divergence sources distributed in the encapsulating shell, and a divergence shape of the rays emitted from the X/β ray divergence sources is constrained to be fan-shaped by their own source windows;

a linear array detector, comprising a plurality of pixel detectors, configured to receive rays emitted from the radiation source and output an attenuated two-dimensional signal; and a plurality of areas irradiated by the X/β ray divergence sources are correspondingly received and detected by single pixels of the linear array detector; and a processor, configured to receive the two-dimensional signal outputted by the linear array detector, calculate and obtain the two-dimensional surface density distribution data of the sample to be detected according to the zero point and calibration model of each pixel detector of the linear array detector, and determine the corresponding actual size of the single surface density data detected by each pixel detector of the linear array detector in the breadth direction and the running direction;

the radiation source and the linear array detector are relatively fixed, a sample to be detected is placed between the radiation source and the linear array detector and can move relative to the radiation source and the linear array detector.

19. A surface density full-detection system applied to the surface density full-detection method according to claim 1, comprising:

a radiation source; the radiation source is an X/β ray divergence source, and a divergence shape of the rays emitted from the X/β ray divergence source is constrained to be fan-shaped by its own source window;

a linear array detector, comprising a plurality of pixel detectors, and configured to receive rays emitted from the radiation source and output an attenuated two-dimensional signal; and a processor, configured to receive the two-dimensional signal outputted by the linear array detector, calculate and obtain the two-dimensional surface density distribution data of the sample to be detected according to the zero point and calibration model of each pixel detector of the linear array detector, and determine the corresponding actual size of the single surface density data detected by each pixel detector of the linear array detector in the breadth direction and the running direction;

the radiation source and the linear array detector are relatively fixed, a sample to be detected is placed between the radiation source and the linear array detector and can move relative to the radiation source and the linear array detector.

20. The surface density full-detection system according to claim 19, wherein the X/β ray divergence source constrains the rays into ray beams reaching the linear array detector through an additional trapezoidal collimator.

* * * * *